United States Patent
Kim et al.

(10) Patent No.: US 10,495,805 B2
(45) Date of Patent: Dec. 3, 2019

(54) DISPLAY DEVICE HAVING QUANTUM DOT

(71) Applicant: INDUSTRY-ACADEMIC COOPERATION FOUNDATION, YONSEI UNIVERSITY, Seoul (KR)

(72) Inventors: Young Joo Kim, Seoul (KR); Se Eun Kim, Seoul (KR); Jae Yong Lee, Cheonan-si (KR); Min Ho Shin, Gimcheon-si (KR); Hyo Jun Kim, Geumsan-gun (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 117 days.

(21) Appl. No.: 15/407,619

(22) Filed: Jan. 17, 2017

(65) Prior Publication Data
US 2018/0017726 A1    Jan. 18, 2018

(30) Foreign Application Priority Data
Jul. 14, 2016  (KR) .................. 10-2016-0089338

(51) Int. Cl.
F21V 8/00  (2006.01)
(52) U.S. Cl.
CPC ........... *G02B 6/005* (2013.01); *G02B 6/0053* (2013.01); *G02B 6/0065* (2013.01)
(58) Field of Classification Search
CPC .............................. G02B 6/005; G02B 6/0053
See application file for complete search history.

(56) References Cited

U.S. PATENT DOCUMENTS

| 2013/0063969 A1* | 3/2013 | Neugebauer ......... G02B 6/0036 362/603 |
| 2014/0133177 A1* | 5/2014 | Miller .................... G02B 6/005 362/607 |
| 2017/0153378 A1* | 6/2017 | Lee ....................... G02B 6/0055 |

(Continued)

FOREIGN PATENT DOCUMENTS

| KR | 10-2010-0047841 A | 5/2010 |
| KR | 10-2011-0131044 A | 12/2011 |

(Continued)

OTHER PUBLICATIONS

Communication dated Jun. 20, 2018, issued by the Korean Patent Office in counterpart Korean Patent Application No. 10-2016-0089338.

(Continued)

Primary Examiner — Jong-Suk (James) Lee
Assistant Examiner — Christopher E Dunay
(74) Attorney, Agent, or Firm — Sughrue Mion, PLLC (57) ABSTRACT

Disclosed is a quantum dot display device including a light emitting unit configured to generate a light; and a color conversion unit configured to convert the light generated from the light emitting unit to a color light. The color conversion unit includes a quantum dot portion configured to convert the light to the color light; a bridge portion configured to provide a color conversion path of the light passing the quantum dot portion and to vertically guide the light; and a prism portion configured to guide the light passing the bridge portion to an outside. The above configuration may enhance the light efficiency by providing a sufficient color conversion path of light.

9 Claims, 6 Drawing Sheets

(56) References Cited

U.S. PATENT DOCUMENTS

| | | | | |
|---|---|---|---|---|
| 2017/0205664 A1* | 7/2017 | Cho | ............ | G02B 6/005 |
| 2017/0254943 A1* | 9/2017 | Murphy | ............ | G02B 6/005 |
| 2017/0357043 A1* | 12/2017 | Kang | ............ | G02B 6/005 |
| 2018/0011235 A1* | 1/2018 | Bae | ............ | G02B 6/0035 |
| 2018/0081190 A1* | 3/2018 | Lee | ............ | G02B 5/1819 |

FOREIGN PATENT DOCUMENTS

| | | | |
|---|---|---|---|
| KR | 10-2015-0074886 A | 7/2015 | |
| KR | 10-2016-0001568 A | 1/2016 | |
| KR | 10-2016-0015831 A | 2/2016 | |
| WO | 2010-109250 A1 | 9/2010 | |

OTHER PUBLICATIONS

Communication dated Feb. 2, 2018, issued by the Korean Patent Office in counterpart Korean Patent Application No. 10-2016-0089338.

* cited by examiner

DISPLAY DEVICE HAVING QUANTUM DOT

CROSS-REFERENCE TO RELATED APPLICATION

This application claims the priority benefit of Korean Patent Application No. 10-2016-0089338 filed on Jul. 14, 2016, in the Korean Intellectual Property Office, the disclosure of which is incorporated herein by reference.

BACKGROUND

1. Field of the Invention

Example embodiments relate to a quantum dot display device, and more particularly, to a quantum dot display device that may enhance the light efficiency according to a luminance enhancement by converting a scattering light to a vertical light.

2. Related Art

A liquid crystal display (LCD) currently in the spotlight is a display that may display an image by applying a voltage to an electric field generation electrode, by applying an electric field to a liquid crystal layer, and by adjusting an arrangement of liquid crystal molecules of the liquid crystal layer to control a polarized axis of incident light in reaction to the electric field. As a backlight unit of the display device, a light emitting diode (LED) is generally employed, which may consume a relatively small amount of power and may realize a vivid color light compared to other backlight units, as disclosed in the related art, for example, Korean Patent Application No. 10-2013-0163087 and Korean Patent Application No. 10-2010-7001056.

In the recent times, since a quantum dot film is included in a backlight unit for display device, research on a quantum dot display device having an excellent color reproduction capability has been actively conducted. An increase in a number of films that constitute the backlight unit including the quantum dot film may cause an increase in a thickness and a complex production process. They may raise price. Accordingly, active research on a complex film for reducing a number of films is currently ongoing.

However, a quantum dot display device using a complex film that includes a quantum dot film may have an excellent color reproduction capability, however, may have the relatively low color conversion efficiency due to a scattering light by an insufficient optical path. An increase in quantum dot concentration of the quantum dot film for color conversion of the quantum dot display device may decrease a luminance. Accordingly, there is a need for various researches that may enhance the color conversion efficiency of the quantum dot display device.

SUMMARY

Example embodiments provide a quantum dot display device that may enhance the light efficiency according to a luminance enhancement by converting a scattering light to a vertical light.

According to an aspect, there is a quantum dot display device including a light emitting unit configured to generate a light; and a color conversion unit configured to convert the light generated from the light emitting unit to a color light. The color conversion unit includes a quantum dot portion configured to convert the light to the color light; a bridge portion configured to provide a color conversion path of the light passing the quantum dot portion and to vertically guide the light; and a prism portion configured to guide the light passing the bridge portion to an outside.

The light emitting unit may include a light source configured to generate the light; a guide layer provided to face the light source and configured to guide the light to the color conversion unit; and a reflective layer provided to face the color conversion unit based on the guide layer, and configured to reflect the light toward the color conversion unit.

The light source may include a light emitting diode (LED).

The quantum dot portion may include a quantum dot layer configured to include a plurality of quantum dots for converting the light to the color light; and a single pair of barrier layers stacked on a top and a bottom of the quantum dot layer based on a heading direction of the light, and configured to protect the quantum dot layer.

The bridge portion may include a sheet on which a plurality of bridge areas for vertically guiding the light corresponding to an angle of total reflection and a plurality of air gaps for providing the color conversion path of the light are alternately disposed in parallel with each other, and stacked on the quantum dot portion.

If a height of the bridge area is H, a width of the bridge area may have a ratio of h tan 50°, and a width of the air gap may have a length corresponding to eight to ten folds relative to the width of the bridge area.

The prism portion may include a prism sheet in a shape of an unevenness or a pyramid having a slope, and stacked on the bridge portion.

The quantum dot portion, the bridge portion, and the prism portion may be modularized through mutual coupling.

According to an aspect, there is provided a method of manufacturing a quantum dot display device, the method including preparing a light emitting unit that generates a light; and preparing a color conversion unit in which a quantum dot portion that converts the light to a color light, a bridge portion that provides a color conversion path of the light passing the quantum dot portion and vertically guides the light, and a prism portion that guides the light passing the bridge portion to an outside are modularized through mutual coupling.

The preparing of the color conversion unit may include forming, on a substrate, a pattern corresponding to the bridge portion in which a plurality of bridge areas and a plurality of air gaps are alternately disposed in parallel with each other through a photolithography process; forming the bridge portion through an ultraviolet (UV) imprinting process of hardening resin on the substrate; coupling a prism portion with one side of the bridge portion; separating the substrate from the bridge portion; and coupling a quantum dot portion with another side of the bridge portion.

Coupling of the prism portion and the quantum dot portion with the bridge portion may be performed by UV emission.

According to an aspect, there is provided a quantum dot display device including a light emitting unit configured to generate a light; and a color conversion unit configured to convert the light generated from the light emitting unit to a color light. The color conversion unit includes a quantum dot layer configured to include a plurality of quantum dots for converting the light to a plurality of color lights; a bridge layer on which a plurality of bridge area for vertically guiding the light passing the quantum dot layer and a plurality of air gaps for providing a color conversion path of the light are alternately disposed, and stacked on the quantum dot layer to couple therewith; and a prism layer stacked on the bridge layer to guide the light to an outside and to couple therewith.

The light emitting unit may include a light source including an LED, and configured to generate the light; a guide layer provided to face the light source and configured to guide the light to the color conversion unit; and a reflective layer provided to face the color conversion unit based on the guide layer, and configured to reflect the light toward the color conversion unit.

A single pair of barrier layers may be stacked on a top and a bottom of the quantum dot layer based on a heading direction of the light, and configured to protect the quantum dot layer.

If a height of the bridge area is H, a width of the bridge area may have a ratio of h tan 50°, and a width of the air gap may have a length corresponding to eight to ten folds relative to the width of the bridge area.

According to some example embodiments, since a light passing a quantum dot portion may be vertically guided by providing a sufficient color conversion path through a bridge portion, it is possible to enhance a luminance, thereby contributing to enhancing the light efficiency.

Also, according to example embodiments, by modularizing a quantum dot portion, a bridge portion, and a prism portion through mutual coupling, it is possible to easily manufacture a quantum dot display device with a slim thickness.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION OF THE INVENTION

Hereinafter, example embodiments will be described with reference to the accompanying drawings. Herein, thicknesses of lines, sizes of constituent elements, etc., illustrated in the drawings, may be exaggerated for clarity and convenience of description. Further, terms described in the following are ones defined based on functions in the present disclosure and thus, may vary based on the intent of a user or an operator, or custom. Accordingly, the definition of such terms should be made based on the overall description disclosed in the present specification.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Hereinafter, example embodiments will be described with reference to the accompanying drawings.

Figure 1:
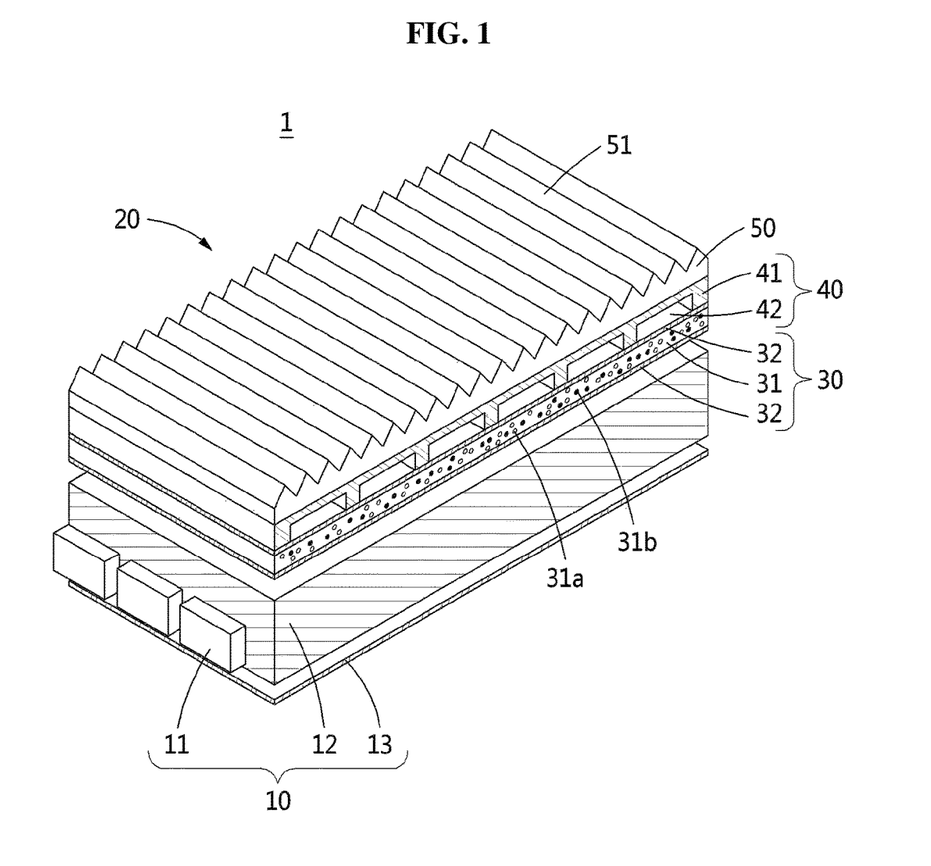
FIG. 1 is a perspective view illustrating a quantum dot display device according to an example embodiment.
Figure 2:
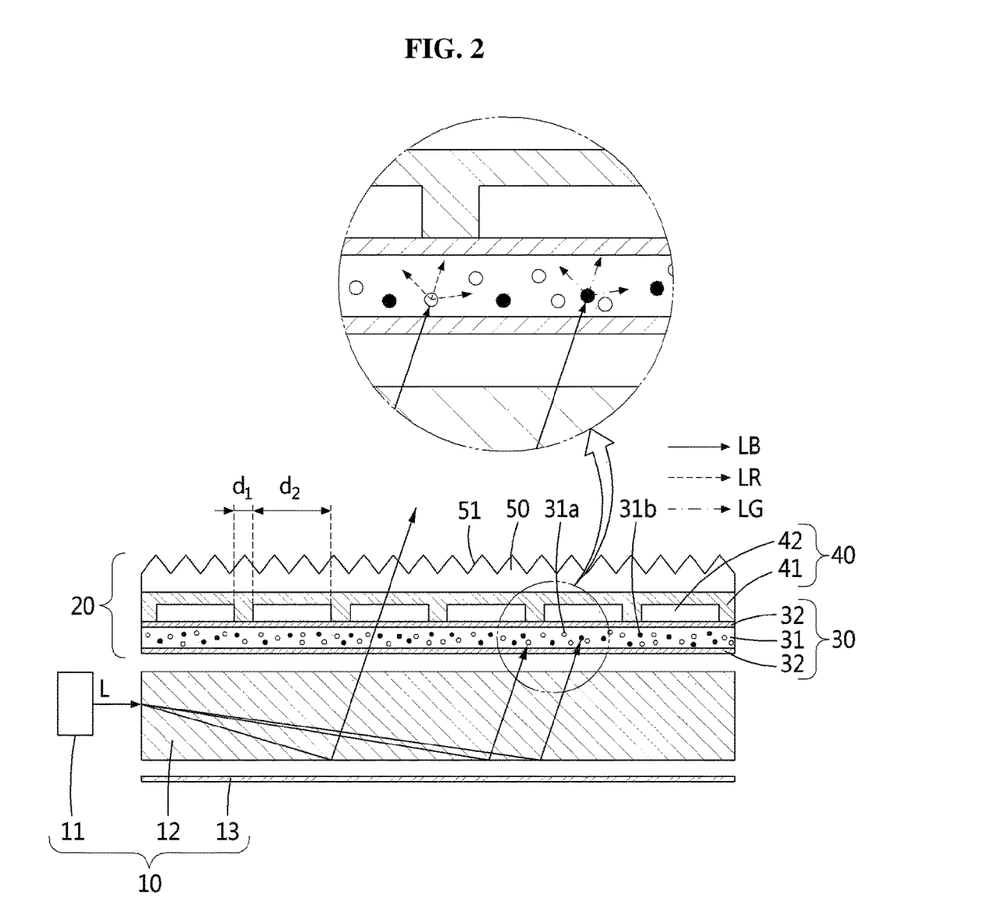
FIG. 2 is a cross-sectional view illustrating the quantum dot display device of FIG. 1.
Figure 3:
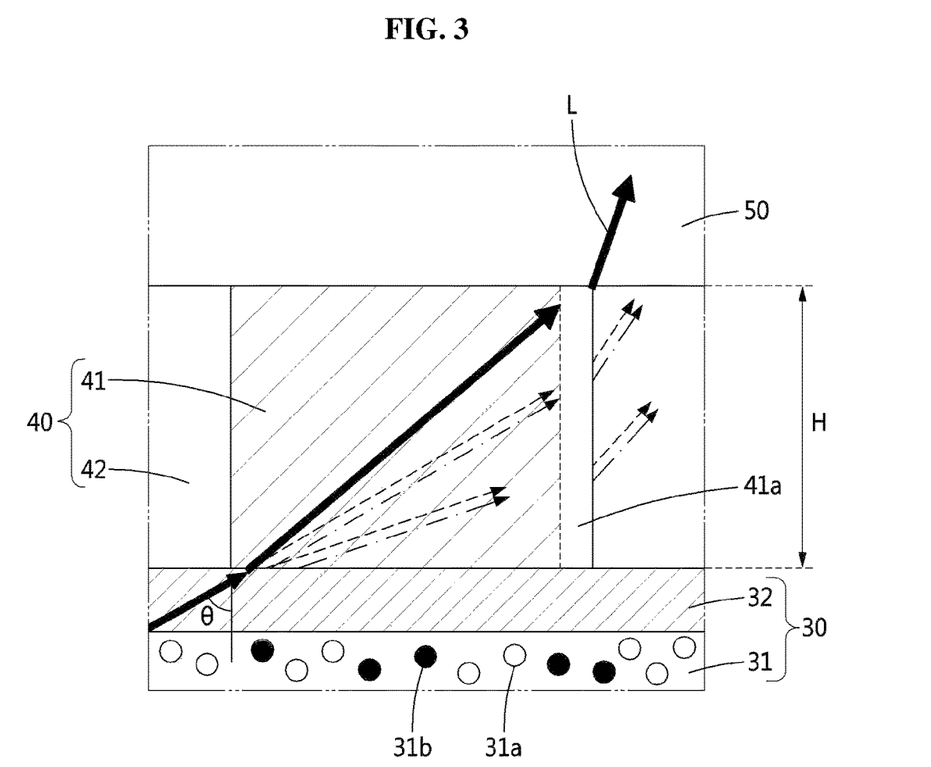
FIG. 3 is an enlarged cross-sectional view illustrating a portion of FIG. 2.
Figure 4:
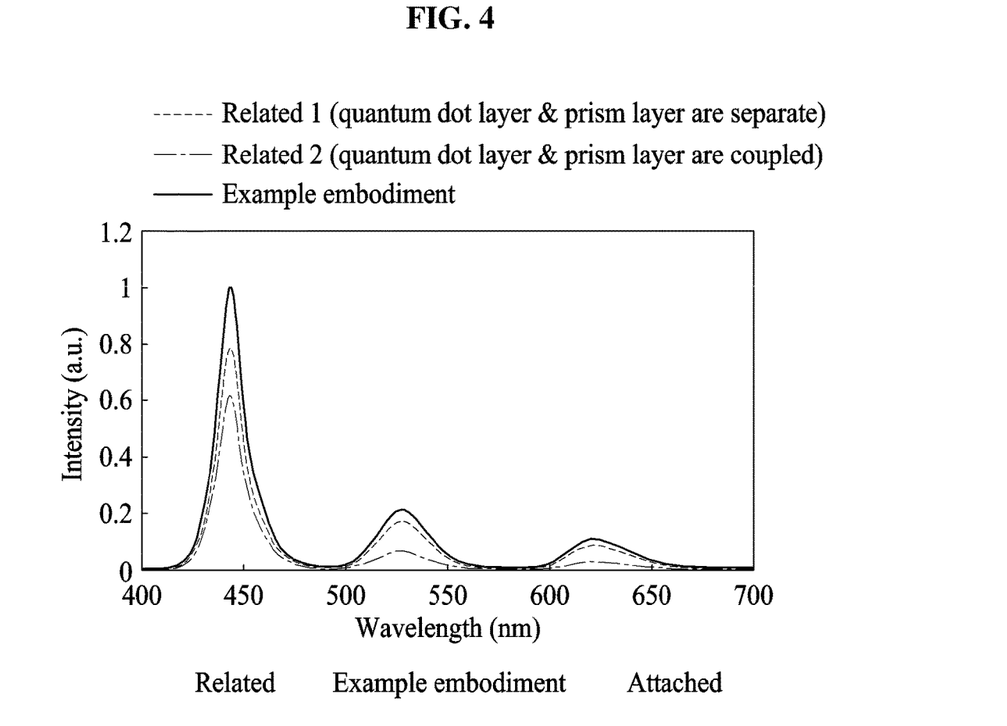
FIG. 4 is a graph showing the light efficiency of the quantum dot display device of FIG. 1.

FIG. 1 is a perspective view illustrating a quantum dot display device according to an example embodiment, FIG. 2 is a cross-sectional view illustrating the quantum dot display device of FIG. 1, FIG. 3 is an enlarged cross-sectional view illustrating a portion of FIG. 2, and FIG. 4 is a graph showing the light efficiency of the quantum dot display device of FIG. 1.

Referring to FIGS. 1 and 2, a quantum dot display device 1 includes a light emitting unit 10 and a color conversion unit 20.

The light emitting unit 10 generates a light. The light emitting unit 10 includes a light source 11, a guide layer 12, and a reflective layer 13.

The light source 11 generates a light L. In the example embodiment, the light source 11 may include a light emitting diode (LED) configured to generate a blue light (LB). However, it is provided as an example only and various modifications examples may be applicable. For example, the light source 11 may include an LED or an organic LED (OLED) configured to generate a white light.

The guide layer 12 is provided to face the light source 11 and guides the light L to the color conversion unit 20. In detail, the guide layer 12 is provided to face the light source 11 and guides a path of the light L generated from the light source 11.

The reflective layer 13 is provided to face the color conversion unit 20 based on the guide layer 12, and reflects the light L toward the color conversion unit 20. The reflective layer 13 may prevent the light L generated from the light source 11 and guided by the guide layer 12 from being leaked instead of being incident to the color conversion unit 20. Accordingly, it is possible to enhance the light use efficiency.

The color conversion unit 20 converts the light L generated from the light emitting unit 10 to a color light. The color conversion unit 20 includes a quantum dot portion 30, a bridge portion 40, and a prism portion 50. The quantum dot portion 30, the bridge portion 40, and the prism portion 50 are modularized through mutual coupling.

Referring to FIG. 2, the quantum dot portion 30 converts the light L to a plurality of color lights, for example, a blue color (LB), a red color (LR), and a green color (LG). The quantum dot portion 30 includes a quantum dot layer 31 and a barrier layer 32 that are stacked on the guide layer 12 of the light emitting unit 10.

The quantum dot layer 31 includes a plurality of quantum dots 31a and 31b configured to convert the light L to the plurality of color lights, for example, LB, LR, and LG. Here, the plurality of quantum dots 31a and 31b refers to particles that hundreds to thousands of atoms have gathered, that is, a semiconductor crystal acquired by synthesizing quanta based on a nanometer (nm) unit. In detail, the plurality of quantum dots 31a and 31b may be formed using II-VI group, III-V group, IV-VI group, IV group semiconductor compounds and the mixture thereof. For example, the plurality of quantum dots 31a and 31b may be formed through selection from CdS, CdSe, CdTe, ZnS, ZnSe, ZnTe, InP, InAs, and/or the mixture thereof.

Although the plurality of quantum dots 31a and 31b is particles of the same component, the plurality of quantum dots 31a and 31b may represent a variety of colors based on a particle size in response to the incidence of the light L. Accordingly, the plurality of quantum dots 31a and 31b may convert the light L generated from the light source 11 to the color light, for example, LB, LR, and LG. In the example embodiment, the light source 11 generates the blue light LB as an example. Thus, the quantum dot layer 31 may include a plurality of quantum dots 31a in red and a plurality of quantum dots 31b in green.

Through the above configuration, the light L may be transmitted as the blue light LB without passing through the quantum dots 31a and 31b of the quantum dot layer 31, whereas the light L passing the red quantum dot 31a and the green quantum dot 31b may be converted to the red light LR and the green light LG and thereby pass.

The barrier layer 32 is stacked on each of a top and a bottom of the quantum dot layer 31 based on a heading direction of the light L and protects the quantum dot layer 31. In detail, a single pair of barrier layers 32 may be provided between the guide layer 12 and the quantum dot layer 31 and between the quantum dot layer 31 and the bridge portion 40, respectively, and protects the quantum dot layer 31 against the penetration of moisture or air. The barrier layer 32 is formed of a polymer material and may secure the reliability of the quantum dot layer 31.

The bridge portion 40 provides a color conversion path of the light L passing the quantum dot portion 30 and also vertically guides the light L. The bridge portion 40 includes a sheet on which a plurality of bridge areas 41 and a plurality of air gaps 42 are alternately disposed in parallel with each other.

The bridge area 41 vertically converts the light L of an area corresponding to an angle of total reflection in the light L passing the quantum dot portion 30, and the air gap 42 provides a path of the light L passing the quantum dot portion 30 to the prism portion 50.

Referring to FIG. 3, the bridge area 41 refracts the light L incident at an angle of θ and passing a wall 41a of the bridge area 41 in a vertical direction. For example, if an incidence angle θ of the light L with respect to the bridge area 41 is within the range of about 50° to 70°, that is, 41° or more, an emitted angle of the light L may be about 0° to 2.5°.

On the contrary, if the bridge area 41 is absent, and if the light L is incident at the angle of 41° or more, the emitted angle of the light L may be within the range of about 52.6° to 68.2°. As described above, since the light L passes through the bridge area 41, the emitted angel of the light L may be vertically converted.

Considering the emitted angle vertically converted based on the incidence angle θ with respect to the bridge area 41, a width $d_1$ of the bridge area 41 may have a ratio of h tan 50° relative to a height H of the bridge area 41. In the example embodiment, the height H for each of the bridge area 41 and the air gap 42 may be around about 8 um.

Also, a width $d_2$ of the air gap 42 may be provided in a shape greater than the width $d_1$ of the bridge area 41. In the example embodiment, the width $d_2$ of the air gap may have a length corresponding to eight to ten folds relative to the width d1 of the bridge area 41 based on a view at which luminance is uniform regardless of a sum of lengths of a single bridge area 41 and a single air gap 42. For example, the example embodiment is described based on an example that $d_2$ is 9 folds relative to $d_1$.

The prism portion 50 vertically guides the color light, for example, LB, LR, and LG, passing the bridge portion 40 to an outside. The prism portion 50 includes a prism layer having a slope 51 and stacked on the bridge portion 40.

In the example embodiment, the prism portion 50 has the slope 51 in a shape of an unevenness. However, it is provided as an example only and the prism portion 50 may have the slope 51 in a shape of a plurality of triangular pyramids, that is, a pyramid, depending on example embodiments. Also, if the prism portion 50 may vertically guide the light L at a corresponding incidence angle, various modification examples of the slope 51, such as a pentatonic pyramid shape, a hexagonal pyramid shape, a diamond shape, etc., may be applicable.

As described above, the color conversion unit 20 is provided as a complex film in which the quantum dot portion 30, the bridge portion 40, and the prism portion 50 are modularized through mutual stacking.

A color conversion operation of the quantum dot display device 1 constructed as above according to the example embodiment will be described with reference to FIG. 2.

The light L generated from the light source 11 of the light emitting unit 10 is guided to the color conversion unit 20 through the guide layer 12. Here, the light L that is to be leaked to an outside without being guided from the guide layer 12 to the color conversion unit 20 is reflected to the color conversion unit 20 by the reflective layer 13.

The light L incident to the color conversion unit 20 may be converted to the color light, for example, LB, LR, and LG, by the quantum dot layer 31 of the quantum dot portion 30. Here, since the light source 11 generates the blue light LB, the light L that does not pass the quantum dot 31a, 31b may be transmitted as the blue light LB as is, and the light L that passes the quantum dot 31a in red and the light L that passes the quantum dot 31b in green may be converted to the red light LR and the green light LG, respectively.

The color light, for example, LB, LR, and LG, converted by the quantum dot portion 30 may be guided vertically toward the prism portion 50 without being totally reflected through the bridge portion 40. In detail, light corresponding to a total reflection angle area in the light L passing the quantum dot portion 30 may be vertically guided by the bridge area 41, and may also be vertically reflected toward the prism portion 50 by the air gap 42. Accordingly, since the light L passing the quantum dot portion 30 is converted to a color with a sufficient light conversion path and is not leaked, it is possible to enhance the light efficiency.

The color conversion light L that passes the bridge portion 40 may be vertically emitted to an outside through the prism portion 50.

The graph of FIG. 4 shows the light efficiency of the quantum dot display device 1 according to the example embodiment. Referring to the graph, the example embodiment in which the quantum dot portion 30, the bridge portion 40, and the prism portion 50 are modularized and coupled with each other has showed increases of about 29.7%, 26.1%, and 25.8% in the light efficiency of blue, green, and red, respectively, compared to the related art 1 in which the quantum dot portion 30 and the prism portion 50 are separate. Also, the example embodiment in which the quantum dot portion 30, the bridge portion 40, and the prism portion 50 are modularized and coupled with each other has showed increases of about 63.1%, 218.7%, and 276.4% in the light efficiency of blue, green, and red, respectively, compared to the related art 2 in which only the quantum dot portion 30 and the prism portion 50 are coupled.

As described above, it can be known that the related art 2 in which sufficient light conversion path is not provided due to coupling of the quantum dot portion 30 and the prism portion 50 shows the relatively low light efficiency compared to the related art 1 in which the quantum dot portion 30 and the prism portion 50 are separate from each other. Also, although the quantum dot portion 30, the bridge portion 40, and the prism portion 50 are modularized through mutual coupling, it is possible to provide a sufficient conversion path of the light L through the bridge portion 40, and thereby vertically refracting and guiding the light L. Accordingly, the most excellent light efficiency may be achieved.

Hereinafter, a method of manufacturing the quantum dot display device 1 according to the example embodiment constructed as above will be described.

Figure 5:
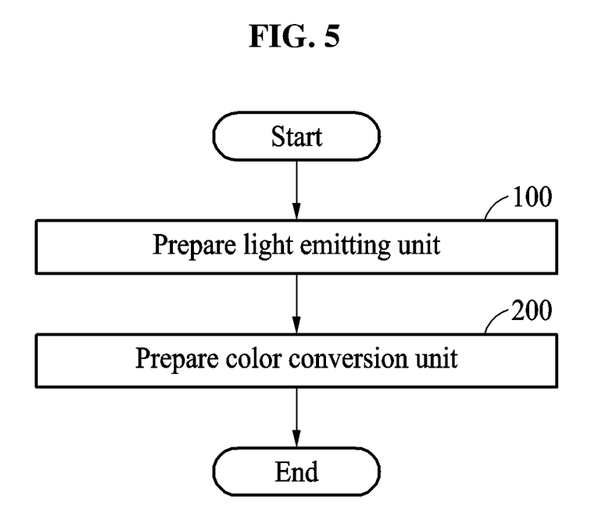
FIG. 5 is a flowchart illustrating a method of manufacturing a quantum dot display device according to an example embodiment.
Figure 6:
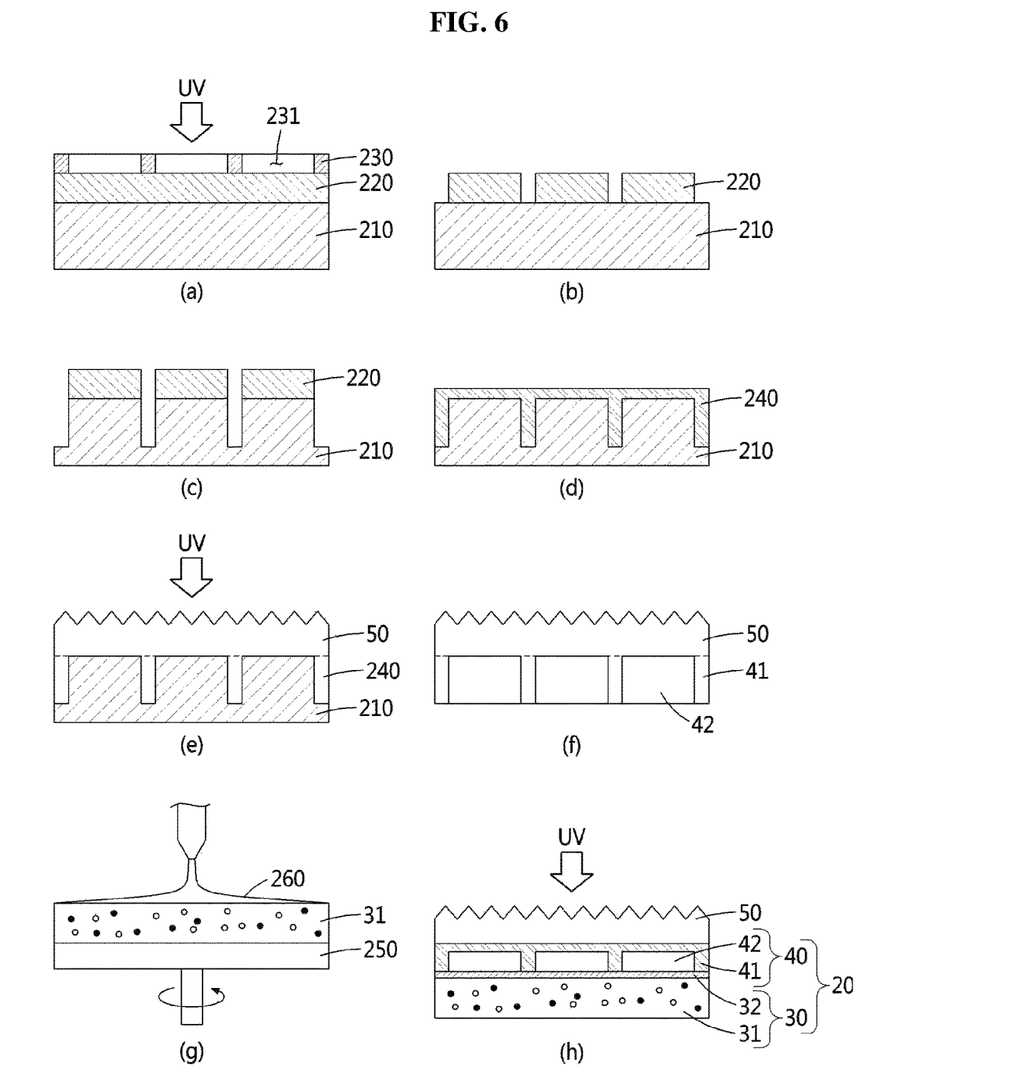
FIG. 6, (a), (b), (c), (d), (e), (f), (g), and (h), are views sequentially illustrating a color conversion unit preparing operation of FIG. 5.

FIG. 5 is a flowchart illustrating a method of manufacturing a quantum dot display device according to an example embodiment, and FIG. 6, (a), (b), (c), (d), (e), (f), (g), and (h), are views sequentially illustrating a color conversion unit preparing operation of FIG. 5.

Referring to FIG. 5, the method of manufacturing the quantum dot display device 1 includes operation 100 of preparing the light emitting unit 10 and operation 200 of preparing the color conversion unit 20. Here, operation 200 of preparing the color conversion unit 20 corresponds to a characteristic configuration of the disclosure and will be further described with reference to FIG. 6.

Referring to (a) of FIG. 6, a mask 230 disposed on a substrate 210 on which photoresist 220 is applied, and ultra violet (UV) rays are emitted thereon. Referring to (b) of FIG. 6 patterning is performed so that an area of the photoresist 220 corresponding to an aperture 231 of the mask 230 may be left on the substrate 210. Referring to (c) of FIG. 3, etching of the substrate 210 is performed to correspond to a pattern.

That is, referring to (a), (b), and (c) of FIG. 6, a pattern corresponding to the bridge portion 40 in which a plurality of air gaps 42 and a plurality of bridge areas 41 are alternately disposed is formed on the substrate 210 through a photolithography process. Referring to (d) of FIG. 6, once the pattern corresponding to the bridge portion 40 is formed on the substrate 210, that is, once patterning is performed on the substrate 210, the bridge portion 40 is formed through an UV imprinting process of applying resin 240 on the patterned substrate 210, emitting UV rays, and hardening the resin 240.

Referring to (e) of FIG. 6, once the bridge portion 40 is formed, the prism portion 50 is coupled with one side of the bridge portion 40 by emitting UV rays. Referring to (f) of FIG. 6 the substrate 210 is separated in a state in which the prism portion 50 and the bridge portion 40 are coupled with each other.

Referring to (g) of FIG. 6, spin coating is performed by supplying photoresist 260 to a rotary plate 250 on which the quantum dot portion 30 including the quantum dot layer 31 is disposed. Here, the photoresist 260 is provided to mutually couple the prism portion 50 and the bridge portion 40.

Referring to (h) of FIG. 6, the quantum dot portion 30 is coupled with another side of the bridge portion 40 that is coupled with the prepared prism portion 50 on its one side. Accordingly, finally provided is the color conversion unit 20 in which the quantum dot portion 30, the bridge portion 40, and the prism portion 50 are modularized through mutual coupling.

Although a few example embodiments have been shown and described, the present disclosure is not limited to the described embodiments. Instead, it would be appreciated by those skilled in the art that changes may be made to these embodiments without departing from the principles and spirit of the disclosure, the scope of which is defined by the claims and their equivalents.

What is claimed is:

1. A quantum dot display device comprising:
   a light emitting unit configured to generate a light; and
   a color conversion unit configured to convert the light generated from the light emitting unit to a color light,
   wherein the color conversion unit comprises:
   a quantum dot portion configured to convert the light to the color light;
   a bridge portion configured to provide a color conversion path of the light passing the quantum dot portion and to vertically guide the light; and
   a prism portion configured to guide the light passing the bridge portion to an outside,
   wherein the bridge portion comprises a sheet in which a plurality of bridge areas for vertically guiding the light corresponding to an angle of total reflection and a plurality of air gaps for providing the color conversion path of the light are alternately disposed in parallel with each other and stacked on the quantum dot portion,
   wherein the plurality of bridge areas have a wall extending in the vertical direction so as to be adjacent to the air gaps and extending vertically between the quantum dot portion and the prism portion,
   wherein the light passing through the wall is refracted in the vertical direction,
   wherein if a height of a bridge area of the plurality of bridge areas is H, a width of the bridge area has a value of H×tan 50°, and
   wherein a width of an air gap of the plurality of air gaps has a length corresponding to eight to ten folds relative to a width of the bridge area.

2. The quantum dot display device of claim 1, wherein the light emitting unit comprises:
   a light source configured to generate the light;

a guide layer provided to face the light source and configured to guide the light to the color conversion unit; and a reflective layer provided to face the color conversion unit based on the guide layer, and configured to reflect the light toward the color conversion unit.

3. The quantum dot display device of claim 2, wherein the light source comprises a light emitting diode (LED).

4. The quantum dot display device of claim 1, wherein the quantum dot portion comprises:

a quantum dot layer configured to include a plurality of quantum dots for converting the light to the color light; and a single pair of barrier layers stacked on a top and a bottom of the quantum dot layer based on a heading direction of the light, and configured to protect the quantum dot layer.

5. The quantum dot display device of claim 1, wherein the prism portion comprises a prism sheet in a shape of an unevenness or a pyramid having a slope, and stacked on the bridge portion.

6. The quantum dot display device of claim 1, wherein the quantum dot portion, the bridge portion, and the prism portion are formed as a module through mutual coupling.

7. A quantum dot display device comprising:

a light emitting unit configured to generate a light; and a color conversion unit configured to convert the light generated from the light emitting unit to a color light, wherein the color conversion unit comprises:

a quantum dot layer configured to include a plurality of quantum dots for converting the light to a plurality of color lights;

a bridge layer in which a plurality of bridge areas for vertically guiding the light passing the quantum dot layer and a plurality of air gaps for providing a color conversion path of the light are alternately disposed, and stacked on the quantum dot layer to couple therewith; and a prism layer stacked on the bridge layer to guide the light to an outside and to couple therewith, wherein the plurality or bridge areas have a wall extending in the vertical direction so as to be adjacent to the air gaps and extending vertically between the quantum dot layer and the prism layer, wherein the light passing through the wall is refracted in the vertical direction, wherein if a height of a bridge area of the plurality of bridge areas is H, a width of the bridge area has a value of H×tan 50°, and wherein a width of an air gap of the plurality of air gaps has a length corresponding to eight to ten folds relative to a width of a bridge area of the plurality of bridge areas.

8. The quantum dot display device of claim 7, wherein the light emitting unit comprises:

a light source comprising a light emitting diode (LED), and configured to generate the light;

a guide layer provided to face the light source and configured to guide the light to the color conversion unit; and a reflective layer provided to face the color conversion unit based on the guide layer, and configured to reflect the light toward the color conversion unit.

9. The quantum dot display device of claim 7, wherein a single pair of barrier layers are stacked on a top and a bottom of the quantum dot layer based on a heading direction of the light, and configured to protect the quantum dot layer.

* * * * *